UNITED STATES PATENT OFFICE.

MAX BUCHNER, OF HEIDELBERG, GERMANY.

METHOD FOR PRODUCING PURE ALUMINA FROM CLAY AND OTHER ALUMINA-BEARING MATERIALS.

1,162,130.            Specification of Letters Patent.      Patented Nov. 30, 1915.

No Drawing.      Application filed June 27, 1914. Serial No. 847,789.

*To all whom it may concern:*

Be it known that I, Dr. MAX BUCHNER, a subject of the Grand Duke of Baden and German Emperor, residing in Heidelberg, Baden, Germany, have invented certain new and useful Improvements in Methods for Producing Pure Alumina from Clay and other Alumina-Bearing Materials; and I do hereby declare the following to be a full, clear, and exact description of the invention, such as will enable others skilled in the art to which it appertains to make and use the same.

Hitherto dependance was had exclusively on the costly beauxites for the manufacture of pure alumina, and no economical and technically practicable methods have been proposed for obtaining this product from low grade materials.

This invention relates to a method of decomposing alumina bearing materials such as clay, beauxite, aluminum nitrid, argillaceous shale and the like, by means of an acid, the undissolved ingredients being filtered off, and the acid radicals of the salts formed by the acid being combined with ammonia to form ammonium salts, and the iron being recovered, also. The said refining is accomplished by separating the mixed precipitates of the hydroxids of aluminum and of iron by means of an alkali-lye, which is freed from its undissolved ferric hydrate, and the aluminum hydroxid is recovered from the alkali-aluminate lye by well known methods, preferably by self precipitation. The alkali-lye remaining from the precipitation of the aluminum hydroxid is re-used for separating a new quantity of ferric and aluminum hydrates. The silicon content and the ferric oxid content of the raw materials may reach a considerable percentage in the raw materials without rendering these materials unfit for treatment by this process by reason of these impurities, consequently many cheap materials, hitherto considered unfit as primary materials for the manufacture of alumina can be used to advantage. On the other hand, the economy lies not only in the cheap raw material, but also in the valuable by-products obtained, such as ammonium salts, thereby considerably reducing the cost of production of the alumina. Finally, by reason of the combination of an acid process with an alkali process in connection with ammonia, many important technical advantages are obtained. All the substances used for the reactions are made use of and returned into the cycle of operations; resulting in a smoothly operating cycle of operations, so that only energy will be consumed.

By way of example, the following mode of operation will be indicative of the process: Clay being the material chosen, it is decomposed by sulfuric acid, either concentrated or dilute. The iron and aluminum contents are converted into ferrous sulfate and aluminum sulfate. If the material treated is not disintegrated by the action of the acid, but remains in lumps, the soluble salts must be leached out or extracted by water, leaving the gangue (for the most part silica) behind. The filtrate or solution resulting from the leaching, as concentrated as possible, is treated with either aqua-ammonia or ammonia gas, preferably the latter. The treatment with ammonia gas gives a precipitate that is more readily filtered out, and for this reason is to be preferred. The precipitated hydrates are separated from the solution and washed, and the liquid worked up to recover the sulfate of ammonium contained dissolved therein. The hydroxid precipitate, containing the hydroxids of iron and aluminum, is placed in hot alkali lye, *i. e.*, hot caustic soda-lye, and the solution hastened if necessary, by additional heating and by stirring. The hydroxid of iron remains undissolved while the aluminum goes into solution as sodium aluminate. The precipitate is filtered out and the aluminum hydrate precipitated by self precipitation. The lye is then put in condition for treatment of fresh quantities of mixed hydrates. The aluminum hydrate is then dried or is reduced to alumina by calcination. If the aluminum hydrate still carries with it traces of iron, the iron may be removed by ferro-cyanid of ammonia. This is done by treating the acid solution of aluminum and iron, obtained by the treatment with sulfuric acid and after the silica or gangue residue has been filtered out or removed, with ammonium ferro-cyanid, thus precipitating the iron as ferric cyanid while the aluminum hydrate is precipitated by ammonia. For the first precipitation other ferro-cyanids may be used, as for example, the ferro-cyanids of sodium or potassium, which may be regenerated after precipitating the iron and may be converted into ferro-cyanid of ammonia, as, for example, as follows

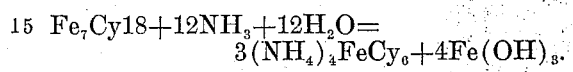

When precipitating the aluminum under ordinary working conditions the precipitate is not obtained in the ordinary mucillagenous state, which is filterable with much difficulty, but is obtained in the form of a paste that does not obstruct the filters. This is a decided advantage. Such paste is of a clayey elementary form and is also less watery than the usual hydrate, and can be more thoroughly washed with less quantities of water, so that the adhering ammonia, and ammonia salts are more readily washed out in a condition suitable for further use. This favorable form of the precipitate of aluminum is reliably obtained if the precipitation is done in concentrated solutions, and the more concentrated the solution of the aluminum salt or mixed aluminum and iron salts is, the more clayey and permeable will be the precipitate. Solutions containing approximately 400 grams of aluminum sulfate $Al_2(SO_4)_3$ per liter are used, but solutions of less concentration may be used, as 100 to 200 grams per liter.

As in carrying out the method the recovery of the ammonia used for precipitation is of great importance, it will, from a technical point of view be good practice to use concentrated solutions, and thereby reduce the cost of concentration of the solution of the ammonia salt.

A further means to render the precipitate easily filtered and washed is by supplying an excess of ammonia when precipitating. This method reduces in a surprising degree the percentage of water in the precipitate, giving it a sandy, granular structure.

The ammonia may be either in solution or in a gaseous state. Even ammoniacal waste gases, such as coke oven gas, Mond's gas, and other industrial gases carrying ammonia may be used as a reagent, by reason of their ammonia content, although it has heretofore been believed that the use of these gases was impracticable and would interfere with the precipitation. Ammonia may be replaced by its organic derivatives or similar substances, so long as they are of a basic nature.

The raw alumina material may be first converted into aluminum nitrid by known methods. The nitrid is decomposed by sulfuric acid or by water, the latter, if ammonia is to be obtained. This ammonia is used for precipitating the hydroxid from the aluminum salt solution. Thus a portion of the ammonia required is produced by the process, and in preparing this portion of ammonia from aluminum nitrid it is possible to use pure alumina obtained during the process.

I claim—

1. The method of producing alumina from low grade raw materials containing also iron, which comprises acting upon the material with a mineral acid, thereby dissolving both iron and aluminium, separating solution and residue, treating the solution with an excess of ammonia thereby precipitating the hydrates of aluminium and iron and forming an ammonia salt of the acid, separating the precipitate and dissolving the aluminium hydrate in alkali and then recovering alumina and alkali.

2. The method of producing alumina from low grade raw materials containing also iron, which comprises acting upon the material with a mineral acid, thereby dissolving both iron and aluminium, separating solution and residue, concentrating the solution, treating this concentrated solution with an excess of ammonia thereby precipitating the hydrates of aluminium and iron and forming an ammonia salt of the acid, separating the precipitate and dissolving the aluminium hydrate in alkali and then recovering alumina and alkali.

3. The method of producing alumina from low grade raw materials containing also iron, which comprises acting upon the material with a mineral acid, thereby dissolving both iron and aluminium, separating solution and residue, treating the solution with ammoniacal waste gases, thereby precipitating the hydrates of aluminium and iron and forming an ammonium salt of the acid, separating the precipitate and dissolving the aluminium hydrate in alkali and then recovering alumina and alkali.

4. The method of producing alumina from low grade raw materials containing also iron, which comprises acting upon the material with a mineral acid, thereby dissolving both iron and aluminium, separating solution and residue, concentrating the solution, treating this concentrated solution with ammoniacal waste gases, thereby precipitating the hydrates of aluminium and iron and forming an ammonium salt of the acid, separating the precipitate and dissolving the aluminium hydrate in alkali, and then recovering alumina and alkali.

5. The method of producing alumina from low grade material containing iron, which comprises dissolving the alumina by suitable means, supplying to the solution ammonia in excess by a reagent containing ammonia, thereby precipitating the alumina and iron as hydrates, dissolving the aluminium hydrate of the precipitate by means of alkali, and recovering the alumina and alkali.

In testimony that I claim the foregoing as my invention, I have signed my name in presence of two subscribing witnesses.

Dr. MAX BUCHNER.

Witnesses:
D. NANEN,
H. MERLE COCHRAN.